C. HEINEN.
WAGON-BRAKES.

No. 195,275. Patented Sept. 18, 1877.

WITNESSES:
A. W. Almqvist
J. H. Scarborough

INVENTOR:
C. Heinen
BY
Munn & Co.
ATTORNEYS.

UNITED STATES PATENT OFFICE.

CHRISTOPHER HEINEN, OF LEAVENWORTH, KANSAS.

IMPROVEMENT IN WAGON-BRAKES.

Specification forming part of Letters Patent No. 195,275, dated September 18, 1877; application filed March 12, 1877.

*To all whom it may concern:*

Figure 1:
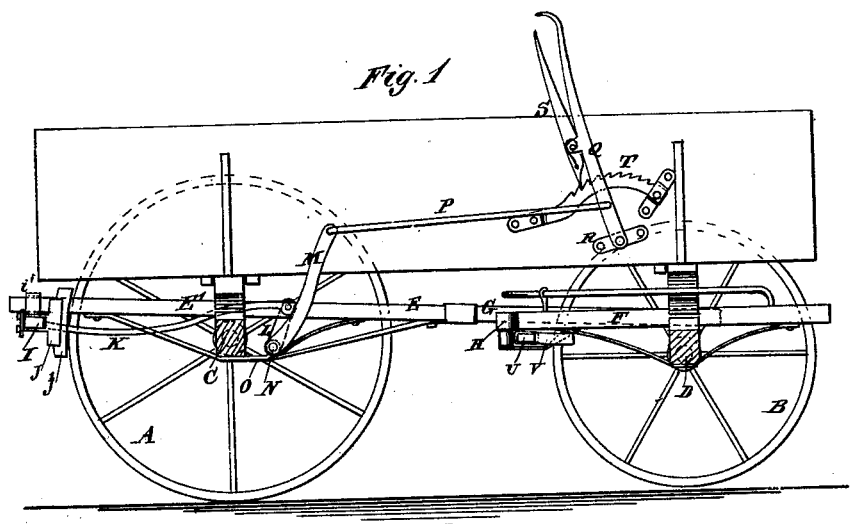
Figure 2:
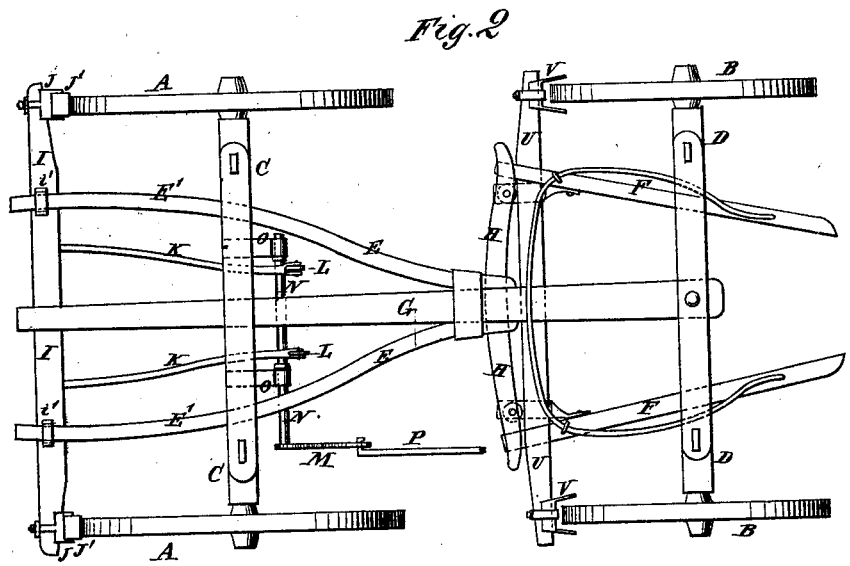
Figure 3:
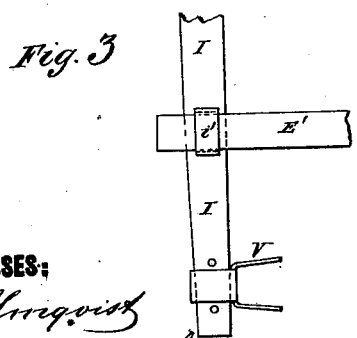
Figure 4:
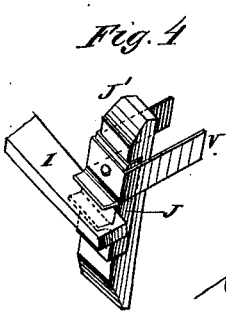

Be it known that I, CHRISTOPHER HEINEN, of Leavenworth city, in the county of Leavenworth and State of Kansas, have invented a new and useful Improvement in Wagon-Brake, of which the following is a specification:

Figure 1 is a side view of a wagon to which my improved brake has been applied, the off wheels being removed. Fig. 2 is a top view of the running-gear, the body being removed. Fig. 3 is a detail top view of the end of the brake-bar, showing the brake-shoe replaced by a mud-scraper. Fig. 4 is a detail perspective view of the end of the brake-bar, showing the brake-shoe provided with a mud-scraper.

Similar letters of reference indicate corresponding parts.

The object of this invention is to furnish an improved brake for wagons, which shall be simple in construction, conveniently applied, and reliable in operation.

The invention will first be described in connection with drawing, and then pointed out in the claims.

A represents the rear wheels, B represents the fore wheels, C the rear axle, D the fore axle, E the rear hounds, F the fore hounds, G the reach, and H the sway-bar, of a wagon.

The rear hounds E are extended in the rear of the rear axle C, and the said extensions E' pass through keepers i' attached to the brake-bar I.

To the end parts of the brake-bar I are secured the castings J, upon the forward side of which are formed slightly wedge-shaped grooves to receive the wooden rub-blocks J', which are thus forced more firmly to their seats by the friction of the wheels.

Upon the castings J are formed, or to them are attached, two bolts, which receive the brake-bar I between them, and have a yoke and nuts placed upon them at the rear side of the said brake-bar to secure the said castings in place.

To the brake-bar I are attached the rear ends of two rods, K, which pass forward through the spaces between the rear axle C and its bolster, and their forward ends are pivoted to the upper ends of short arms L formed upon or rigidly attached to the shaft N. The shaft N works in bearings O attached to the rear axle C, and to one of its ends is rigidly attached, or upon it is formed, a longer arm, M, which projects upward at the side of the wagon box or body, and to its upper end is pivoted the rear end of a rod, P. The rod P extends forward along the side of the wagon box or body, and to its forward end is pivoted the lever Q, the lower end of which is pivoted to a pivot, R, bolted to the lower part of the side of the wagon-body. The lever Q has a slot formed in it, or a keeper attached to it to receive the curved or arched bar T, the ends of which are bent inward, and are bolted to the side of the wagon-body.

The upper edge of the arched bar T is notched to receive the spring-lever pawl S attached to the lever Q.

To the rear part of the forward hounds F is attached a bar, U, to the ends of which, directly opposite the rims of the fore wheels B, are secured by bolts or clips U-shaped or forked irons V, to receive the rims of the said wheels and scrape off any mud that may adhere to said rims. Similar U-shaped or forked irons V may be attached to the brake-shoe irons J, as shown in Fig. 4; or in case the brake-shoes J J' are not needed, the irons V may be attached to the ends of the brake-bar I, as shown in Fig. 3.

Having thus described my invention, I claim as new and desire to secure by Letters Patent—

1. The combination of the brake-bar I, the rods K, the arms L, the shaft N, the arm M, the connecting-rod P, the lever Q, the notched bar T, and the lever-spring pawl S with each other and with the rearward extension E' of the rear hounds E, substantially as herein shown and described.

2. The combination of the bar U and the U-shaped scrapers V with the forward hounds F and the fore wheels B, substantially as herein shown and described.

CHRISTOPHER HEINEN.

Witnesses:
- WM. T. SKELTON,
- MATHIAS SCHEIEDT.